Sept. 16, 1930.  L. VECCHIO  1,775,876
METHOD OF PURIFYING EXHAUST GASES
Filed Dec. 12, 1925
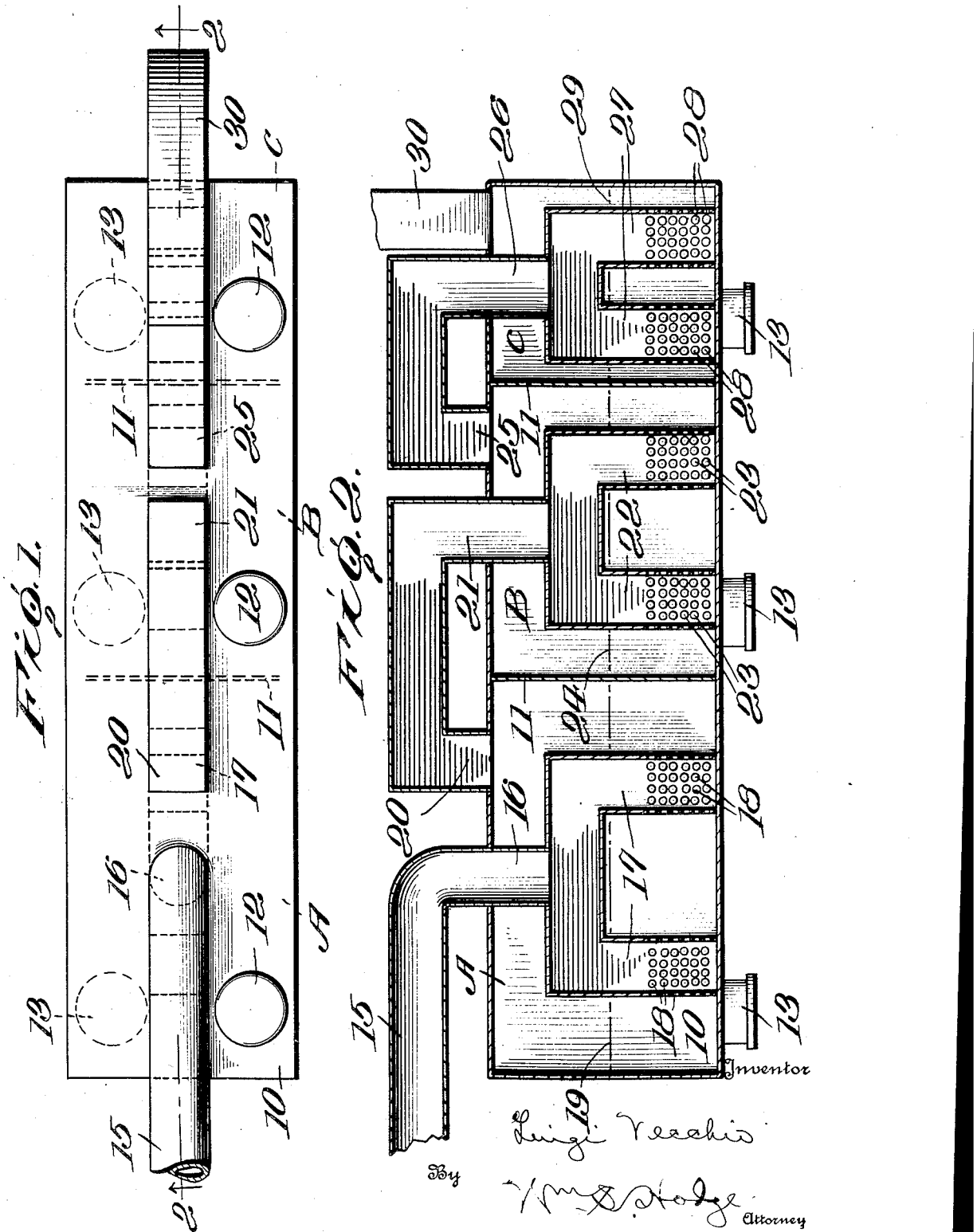

Patented Sept. 16, 1930

1,775,876

UNITED STATES PATENT OFFICE

LUIGI VECCHIO, OF SCHENECTADY, NEW YORK

METHOD OF PURIFYING EXHAUST GASES

Application filed December 12, 1925. Serial No. 75,013.

This invention is a method for purifying exhaust gases delivered by an explosive engine.

One of the objects of the invention is to so purify the exhaust gases of an explosive engine, as to prevent the discharge of noxious fumes, smoke and other objectionable impurities, into the surrounding atmosphere. A further object is to subject the exhaust gases to a plurality of different forms of cleansing and purifying operations before being discharged into the surrounding atmosphere.

The invention will be hereinafter fully set forth and particularly pointed out in the claim.

In the accompanying drawing:—

Figure 1 is a top plan view of a purifier constructed in accordance with the invention. Figure 2 is a longitudinal sectional view thereof.

Referring to the drawing, 10 designates a casing which is divided by partition walls 11, into any desired number of chambers, three such chambers A, B and C being illustrated. Each chamber is provided in its top wall with a filling pipe 12, and in its bottom with a drain pipe 13, said pipes 12 and 13 being normally closed in suitable manner. The chambers A, B and C may be of any desired dimensions, but it is preferred to arrange them in series as shown, and of progressively smaller volume.

Leading from the exhaust pipe (not shown) of an explosive engine is an inlet conduit 15, provided with a down-turned branch 16 leading through the top wall of the chamber A. Said down-turned branch is divided into a plurality of discharge branches 16, provided with perforations 18 near their lower ends. It will be noted that the perforations are located below the level of a liquid 19, preferably liquid ammonia, contained within the said chamber.

Leading from the upper portion of the chamber A through the top wall thereof, is a discharge conduit 20, which has a branch 21 extending downwardly through the top wall of the chamber B, and provided with discharge branches 22, which are perforated as indicated at 23. The chamber B contains a liquid 24, preferably alcohol and water in sufficient quantity to bring the surface level of the liquid above the perforations 23.

Leading from the upper portion of the chamber B through the top wall, is a second discharge conduit 25 which is provided with a downwardly directed branch 26, passing through the top wall of the chamber C, and terminating with discharge branches 27, which are provided with perforations 28. The perforations 28 extend below the level of the liquid 29 contained in said chamber C. Said liquid consists of a vegetable oil and water in sufficient quantity to bring the surface level of the liquid above the perforations.

Leading from the upper portion of the chamber C through the top wall, is a discharge pipe 30, which delivers the purified gases into the surrounding atmosphere.

In operation, the casing 10 is supported in suitable manner and in a position to connect the intake conduit 15 with the exhaust pipe of an explosion engine. The exhaust gases passing into the pipe 15 are delivered to the branches 17, and pass out of the perforations 18 and upwardly through the ammonia liquid 19, into the space above the level of said liquid. The effect of this is to neutralize or saponify the oily constituents which are brought into the chamber with the exhaust gases. The gases after this partial purification pass from chamber A into chamber B, being discharged through the perforations 23 below the level of the liquid 24, and passing upwardly through said liquid into the space above the surface thereof. The alcohol in the liquid 24 tends to dissolve any gummy or tarry substances which may have been carried over from chamber A into chamber B. From chamber B the gases travel through the conduit 25, and are delivered into chamber C below the level of the liquid 29, through the perforations 28. The oil in said chamber C acts in the nature of a filter to catch and withhold any solids or insoluble matter which may have passed through the other chambers. Finally the purified gases are discharged through the pipe 30 into the surrounding atmosphere. The chambers are filled with the various liquids through the respective pipes 12, and any sludge or impurities which may accumulate are cleaned out from time to time, through the drain pipes 13.

The advantages of the invention will be readily apparent to those skilled in the art to which it belongs. It will be particularly noted that the exhaust gases are passed through a series of successive treatments which tend to remove all oil and gummy substances, as well as solids, thereby avoiding the discharge of such substances into the surrounding atmosphere.

Having thus explained the nature of the invention and described an operative manner of constructing and using the same, although without attempting to set forth all of the forms in which it may be made, or all of the forms of its use, what is claimed is:—

The method of purifying exhaust gases of internal combustion engines comprising introducing said gases below the surface of a liquid capable of extracting oily substances therefrom and causing said gas to pass out of said liquid in an upward direction, then introducing the partially purified gas below the surface of a second liquid capable of extracting gummy substances therefrom and causing the gas to pass out of said second liquid in an upward direction, and finally introducing the partially purified gases below the surface of a third liquid capable of mechanically removing solids and insoluble matter and also causing said gases to pass out of the liquid in an upward direction, the upward travel of the gases through the respective liquids causing the action of gravity to assist the liquids in preventing the heavier constituents from passing out of the liquid with the gases.

In testimony whereof I have hereunto set my hand.

LUIGI VECCHIO.